US005343607A

United States Patent [19]

Southerland, Jr. et al.

[11] Patent Number: 5,343,607

[45] Date of Patent: Sep. 6, 1994

[54] GASKET AND SNAP RING INSTALLATION TOOL

[75] Inventors: James M. Southerland, Jr., Aiken; Curtis N. Barringer, Jr., Orangeburg, both of S.C.

[73] Assignee: The United States of America as represented by the United States Department of Energy, Washington, D.C.

[21] Appl. No.: 109,925

[22] Filed: Aug. 23, 1993

[51] Int. Cl.[5] .............................................. B23P 19/02

[52] U.S. Cl. ......................................... 29/229; 29/235

[58] Field of Search ................. 29/229, 270, 278, 280, 29/271, 243.56, 235, 282, 255

[56] References Cited

U.S. PATENT DOCUMENTS

| | | |
|---|---|---|
| 705,564 | 7/1902 | Dorman . |
| 2,357,139 | 8/1944 | Seme . |
| 2,422,549 | 6/1947 | Hogin . |
| 2,510,206 | 6/1950 | Barkan et al. . |
| 2,840,892 | 7/1958 | Erdmann . |
| 2,885,770 | 5/1959 | Wurzel . |
| 3,030,700 | 4/1962 | Jensen . |
| 3,177,565 | 4/1965 | Martin, Jr. . |
| 3,268,993 | 8/1966 | Conner . |
| 3,347,083 | 10/1967 | Turpin et al. . |
| 3,483,606 | 12/1969 | Ethridge et al. . |
| 3,995,360 | 12/1976 | Millheiser . |

*Primary Examiner*—Robert C. Watson

*Attorney, Agent, or Firm*—Brian R. Tumm; Harold M. Dixon; William R. Moser

[57] ABSTRACT

A tool for installing a gasket and a snap ring including a shaft, a first plate attached to the forward end of the shaft, a second plate slidably carried by the shaft, a spring disposed about the shaft between the first and second plates, and a sleeve that is free to slide over the shaft and engage the second plate. The first plate has a loading surface with a loading groove for receiving a snap ring and a shoulder for holding a gasket. A plurality of openings are formed through the first plate, communicating with the loading groove and approximately equally spaced about the groove. A plurality of rods are attached to the second plate, each rod slidable in one of the openings. In use, the loaded tool is inserted into a hollow pipe or pipe fitting having an internal flange and an internal seating groove, such that the gasket is positioned against the flange and the ring is in the approximate plane of the seating groove. The sleeve is pushed against the second plate, sliding the second plate towards the first plate, compressing the spring and sliding the rods forwards in the openings. The rods engage the snap ring and urge the ring from the loading groove into the seating groove.

20 Claims, 2 Drawing Sheets

FIG-3
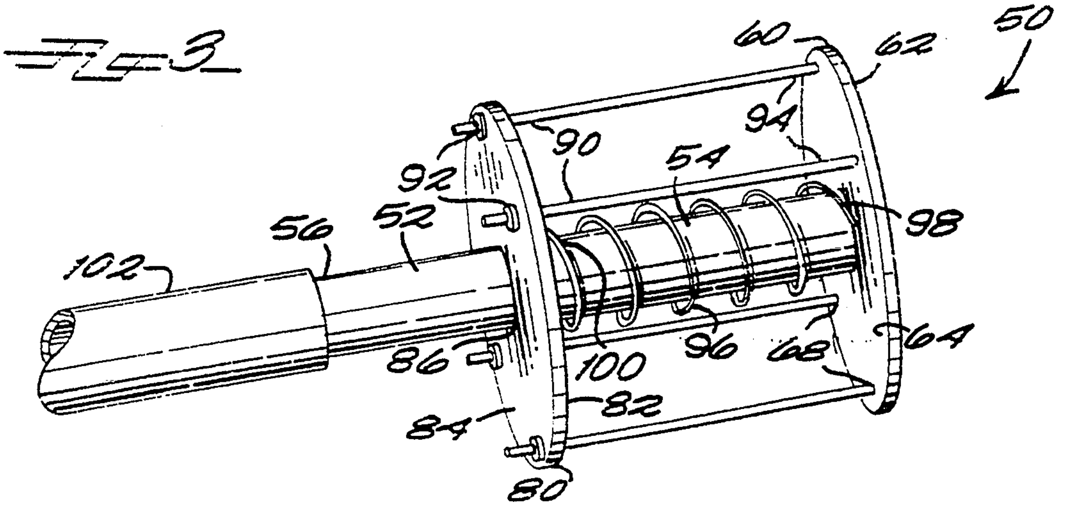
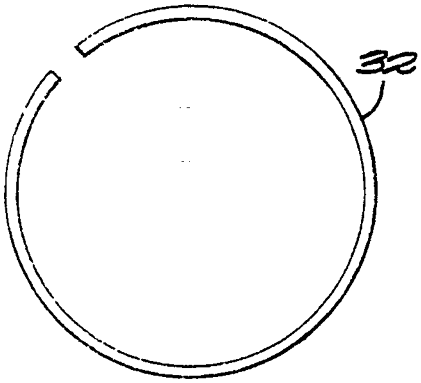
FIG-2
FIG-4
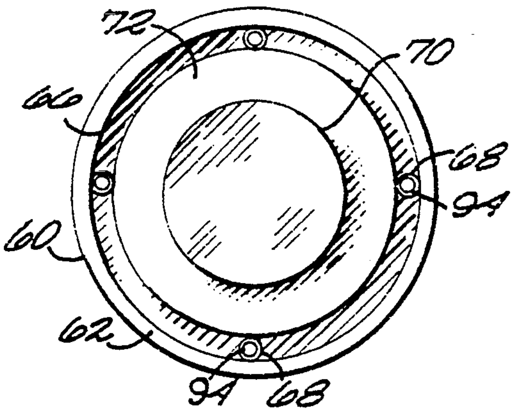
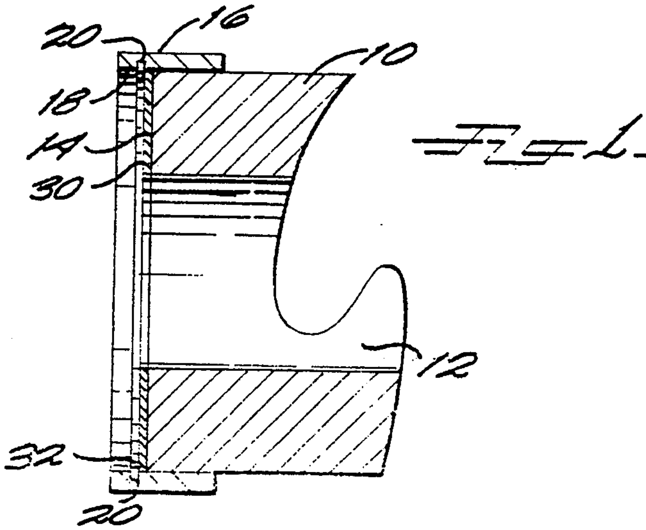
FIG-1

GASKET AND SNAP RING INSTALLATION TOOL

BACKGROUND OF THE INVENTION

1. Field of the Invention

The present invention relates to a gasket and snap ring installation tool. In particular, the present invention relates to a tool for placing a gasket against an interior flange of a hollow tube such as a pipe or pipe fitting and installing a snap ring into an interior seating groove to secure the gasket in position. The United States Government has rights in this invention pursuant to Contract No. DE-AC09-89SR18035 between the U.S. Department of Energy and Westinghouse Savannah River Company.

2. Discussion of Background

When a gasket is placed against an interior flange of a pipe, pipe joint or pipe fitting, it is frequently secured in position by inserting an expandable spring ("snap ting") into a seating groove formed in the inner surface of the pipe. A cross-sectional view of such a gasket and snap ring installation is shown in FIG. 1. A pipe or pipe fitting 10 has a bore 12 and an interior flange or end surface 14. A fitting 16 with an inner surface 18 is positioned over pipe 10. Fitting 16 has an internal seating groove 20 formed in surface 18, dimensioned for receiving a snap ring, retaining ring, locking ring or the like. A gasket 30 is positioned against surface 14, and a snap ring 32 is inserted into seating groove 20. A typical snap ring 32 is shown in FIG. 2. Placement of ring 32 into groove 20 requires that the ring be compressed to a diameter somewhat smaller than the internal diameter of fitting 16, positioned inside fitting 16 approximately in the plane of groove 20, and released to spring into the groove.

A number of tools are available for installing snap rings, retaining rings and the like. Some tools use inner and outer cylindrical sleeves, biased by a spring so that when a force is exerted on the outer sleeve, the inner sleeve rams the ring into the seating groove (Millheiser, U.S. Pat. No. 3,995,360; Hogan, U.S. Pat. No. 2,422,549; Wurtzel, U.S. Pat. No. 2,885,770). Jensen (U.S. Pat. No. 3,030,700) incorporates a tapered member to expand the ring prior to insertion. Ethridge, et al. (U.S. Pat. No. 3,483,606) teaches a snap ring installation tool wherein the inner sleeve is rotated to impart the necessary force.

Other tools use a "gun" or trigger-type mechanism to impart the force required to insert the ting. For example, Conner (U.S. Pat. No. 3,268,993) and Barkan, et al. (U.S. Pat. No. 2,510,206) employ a handle in communication with an inner sleeve that transports the ring into the pipe. Martin, Jr., et al. (U.S. Pat. No. 3,177,565) also discloses a magazine that eliminates the hand loading of tings.

Both Seine (U.S. Pat. No. 2,357,139) and Turpin, et al. (U.S. Pat. No. 3,347,083) teach tools wherein the ring is placed in a hollow member and a removable handle is placed therein to push the ring into the pipe. Turpin, et al. further provides means whereby the ring is expanded as it travels the length of the transporting member. Erdmann (U.S. Pat. No. 2,840,892) shows a piston and plunger type arrangement with a magazine for loading the tings mechanically. Dorman (U.S. Pat. No. 705,564) teaches a machine for sealing bottles. The machine contains a lever that, when pulled, contracts an internal cylindrical member. This contraction causes an attached plunger to forcibly place a cork on the bottle top.

Despite the availability of these devices, gaskets and snap rings are frequently inserted manually or with the aid of hand tools such as pliers. To install gasket 30 and ring 32 as shown in FIG. 1, the operator holds gasket 30 against surface 14 with one hand while working ring 32 into position using the other hand. Installing a single gasket and snap ring can take as long as 10–15 minutes, an interval of time that may be of concern if the pipe normally carries toxic or radioactively hazardous materials. The gasket and ring may be damaged by the manipulation required for installation, adversely affecting their performance. In addition, some types of gaskets contain friable materials such as asbestos which, if damaged, may present additional hazards to the operator.

There is a need for a tool that can be used to quickly and easily install a gasket and snap ring. The tool should be simple to load, to operate, and to manufacture.

SUMMARY OF THE INVENTION

According to its major aspects and broadly stated, the present invention is a tool for installing a gasket and a snap ring into a hollow tube such as a pipe or pipe fitting. The tool includes a shaft having a forward end and a rearward end, a first plate attached to the forward end of the shaft, a second plate slidable on the shaft, and a spring disposed about the shaft between the first and second plates. A sleeve is positioned on the shaft, rearward of the second plate. The forward surface of the first plate has a generally circular loading groove dimensioned for receiving a snap ring, and a raised surface forming a shoulder dimensioned for holding a gasket. A plurality of openings are formed through the first plate, communicating with the loading groove and approximately equally spaced about the groove. A plurality of rods are attached to the forward surface of the second plate, each rod being slidable in one of the openings in the first plate.

To install a gasket and snap ting, the ring is inserted into the loading groove of the first plate and the gasket is positioned on the shoulder, over the snap ring. The tool is inserted into a pipe or pipe fitting having an internal flange and an internal seating groove, such that the gasket engages the flange and the snap ring lies approximately in the plane of the seating groove. The sleeve is pushed against the second plate, sliding the second plate towards the first plate and compressing the spring. The rods move forwards, engaging the snap ring and urging the ring out of the loading groove. Once pushed from the loading groove, the ring springs into the seating groove of the pipe to secure the gasket in position against the flange. After loading the tool, the operator can install a gasket and snap ring in as little as 5 seconds without needing to contact the pipe or pipe fitting. This reduces the time during which he or she is exposed to radioactive or other potentially hazardous substances to less than 1/100 the time required for conventional manual installation.

An important feature of the present invention is the cooperation between the first plate, the second plate, the shaft and the rods. When the tool is loaded and inserted into a pipe, the first plate holds the snap ring and gasket in the proper position for installation. The first and second plate are axially aligned on the shaft so that, when the second plate slides towards the first plate, the rods slide forwards in the openings of the first plate. This arrangement allows the rods to transfer the forward motion of the second plate to the snap ring, to urge the ring from the loading groove of the first plate into the seating groove of the pipe.

The combination of the sleeve, the second plate and the rods is another, important feature of the present invention. These not only transfer linear motion of the sliding of the sleeve on the shaft forward to urge the snap ring into place by the rods, but also they distribute that motion radially outward and do so evenly so that the snap ring is installed quickly and properly and with one-handed operation by the installer.

Another important feature of the present invention is the loading surface of the first plate, which holds the gasket and ring in alignment with each other and with respect to the end of the pipe. Use of the loading surface divides the time it takes to install them between a larger portion for loading the ring and gasket onto the tool away from the pipe and a much smaller portion putting them into position in the pipe. In a hazardous environment, it is this latter portion that exposes the installer to harm. Minimizing time minimizes exposure.

Another feature of the present invention is the spring. The spring is disposed about the shaft between the first and second plates to bias the plates to a preferred position with respect to each other. When the loaded tool is positioned with the gasket against an internal flange, the sleeve is pushed against the second plate to move the second plate from the preferred position towards the first plate. As the second plate moves forwards, the spring compresses and the rods slide forwards in the openings of the first plate to urge the snap ring from the loading groove. Once the ring is expelled from the loading groove, the spring expands to retract the loading surface and return the plates to their preferred respective positions.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a cross-sectional view of a pipe fitting showing a gasket and snap ring installation;

FIG. 2 is a view of the snap ring of FIG. 1;

FIG. 3 is a perspective view of a gasket and snap ring installation tool according to a preferred embodiment of the present invention;

FIG. 4 is an end view of the tool of FIG. 3;

DETAILED DESCRIPTION OF A PREFERRED EMBODIMENT

Figure 5A:
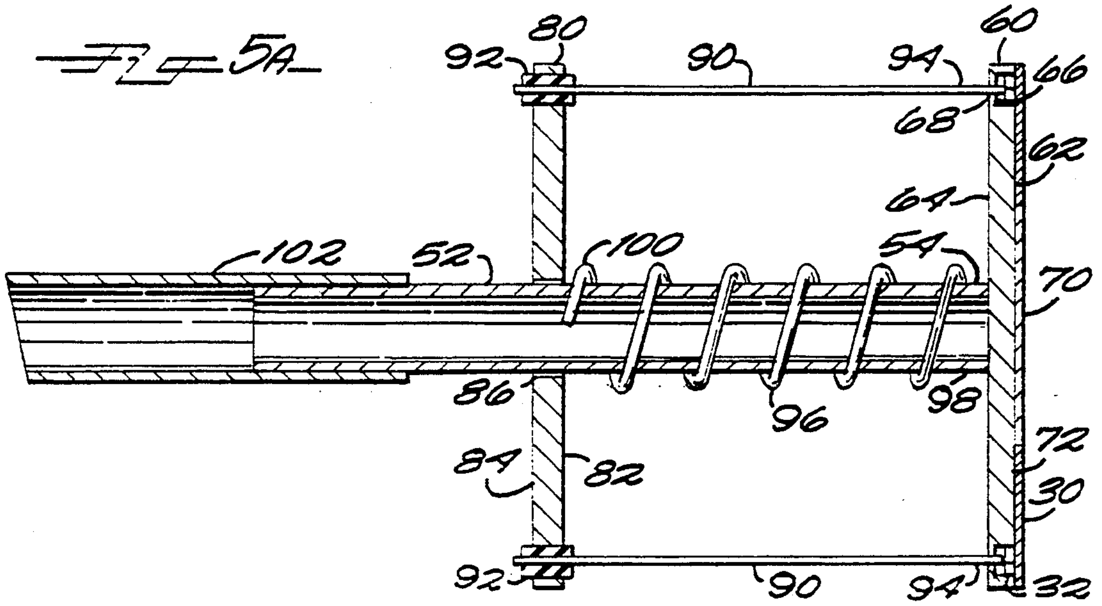
FIG. 5A is a cross-sectional view of the tool of FIG. 3, loaded with a gasket and snap ring.

In the following description, similar components are referred to by the same reference numeral in order to simplify the understanding of the sequential aspect of the drawings.

Referring now to FIG. 3, there is shown a perspective view of a gasket and snap ring installation tool 50 according to a preferred embodiment of the present invention. Tool 50 is used for installing a gasket and a snap ring into a pipe or pipe fitting such as fitting 16 of FIG. 1. Tool 50 has a shaft 52 with a first, forward end 54 and a second, rearward end 56. A first, or gasket plate 60 is attached to forward end 54. Plate 60 has a forward, loading surface 62 and a rearward surface (>4. Plate 60 preferably has a diameter somewhat smaller than the internal diameter of fitting 16.

A generally circular groove 66 is formed in loading surface 62, as best seen in FIGS. 4 and 5A. Loading groove 66 is dimensioned for receiving a snap ring or retaining ring to be installed in seating groove 20, such as ring 32. Preferably, loading groove 66 has a diameter somewhat smaller than the diameter of ring 32, so that the ring is compressed for insertion into groove 66. A plurality of openings 68 are formed through first plate 60. Openings 68 communicate with loading groove 66 and are preferably approximately equally spaced about the groove (FIGS. 4, 5A). Loading surface 62 has a raised central portion 70, forming a shoulder 72 dimensioned for receiving a gasket such as gasket 30.

Figure 5B:
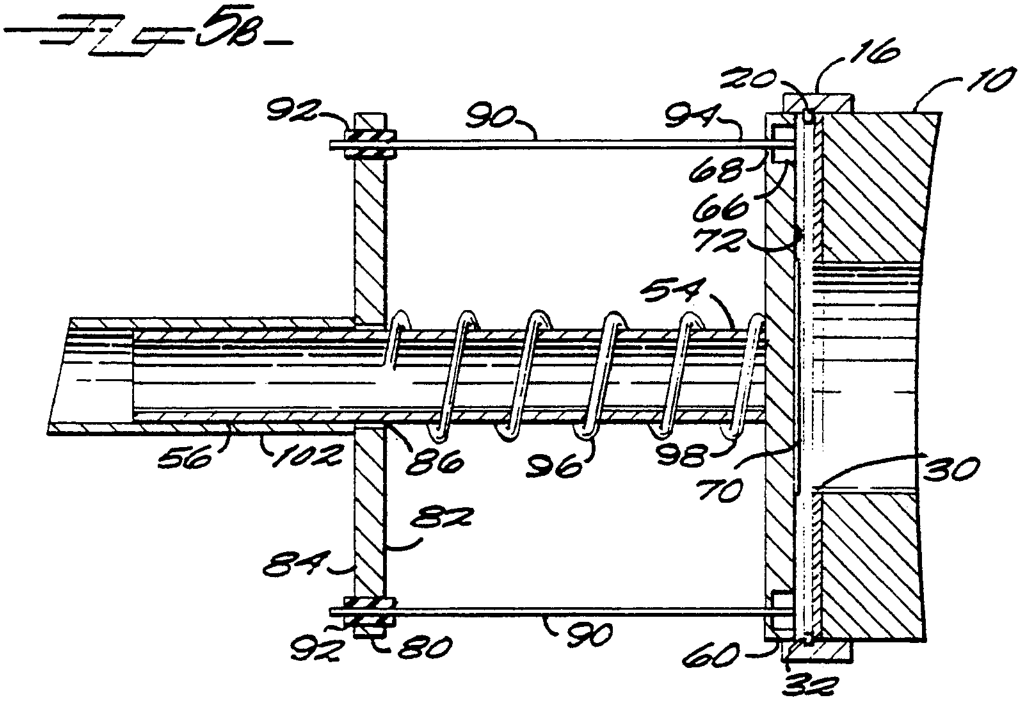
FIG. 5B shows the tool of FIG. 5A in use.

A second, push plate 80 has a first, forward surface 82, a second, rearward surface 84, and a central aperture 86 (FIG. 3). Shaft 52 extends through aperture 86 so that plate 80 is slidably carried by the shaft. As best seen in FIGS. 5A and 5B, plate 80 is coaxial with and approximately parallel to plate 60. A plurality of rods 90, preferably equal in number to the number of openings 68 in first plate 60, are attached to second plate 80 by fasteners 92, such as bolts, screws or the like. Rods 90 are approximately perpendicular to plates 60 and 80 and parallel to shaft 52. Rods 90 are positioned so that their forward ends 94 are slidable in openings 68 to enter groove 66.

A coiled spring 96 is disposed about shaft 52, positioned between first plate 60 and second plate 80 so that a forward end 98 of spring 96 engages rearward surface 62 of first plate 60, and a rearward end 100 of spring 96 engages forward surface 82 of second plate 80 (FIG. 3). Spring 96 biases first plate 60 and second plate 80 to a preferred position with respect to each other so that, when spring 96 is compressed or extended, the spring exerts a restoring force to return the plates to their preferred respective position.

A sleeve 102 is positioned about shaft 52, rearward of second plate 80. When sleeve 102 is pushed against second plate 80, second plate 80 slides towards first plate 60 and spring 96 is compressed. Rods 90 move in a direction approximately perpendicular to plate 60, so that ends 94 slide forwards in openings 68 to enter loading groove 66.

Tool 50 is loaded by inserting ring 32 into loading groove 66 of forward surface 62 (see FIG. 5A). Ring 32 may be a snap ring, or, if needed for the particular installation, a locking ring, retaining ring or the like. Depending on the size and stiffness of ring 32, it may simply be compressed by hand and placed into loading groove 66. Alteratively, pliers or some other convenient tool may be used to insert ring 32 into the groove. To ensure that ring 32 moves into seating groove 20 upon leaving groove 66, first plate 60 has a diameter somewhat smaller than the internal diameter of fitting 16, and groove 66 preferably has a diameter somewhat smaller than the diameter of uncompressed ting 32. Gasket 30 is placed over ring 32 on shoulder 72, maintained in position by raised central portion 70. When tool 50 is used in piping that may be contaminated with radioactive or other hazardous substances, tool 50 may be loaded in a hood, glove box, glove bag or the like to reduce operator exposure. Similar precautions may be taken when loading tool 50 with a gasket and/or snap ring that contains potentially hazardous materials such as asbestos.

Loading surface 62 is inserted into fitting 16 until gasket 30 rests snugly against surface 14, with shaft 52 approximately perpendicular to surface 14 and with snap ring 32 approximately in the plane of seating groove 20. Sleeve 102 is moved forwards to engage rearward surface 84 of second plate 80, pushing plate 80 towards first plate 60 and compressing spring 96 (FIG. 5B). Shaft 52 guides second plate 80 and spring 96, maintaining plates 60 and 80 in axial alignment. Rods 90 slide forwards in openings 68 of first plate 60. As forward ends 94 of rods 90 enter loading groove 66, ends 94 engage snap ring 32 and urge the ring forwards, out of groove 66. Thus, plate 80 redistributes the force exerted by sleeve 102 radially outward to rods 90, which are approximately parallel to sleeve 102 and shaft 52. Rods 90 transfer the force to snap ring 32 to urge the ring from loading groove 66. Pushed out of groove 66 by rods 90, ring 32 moves into seating groove 20, where it secures gasket 30 in place. Spring 96 expands into groove 20 and rods 90 rebound, returning second plate 80 to its preferred position with respect to first plate 60. Tool 50 is withdrawn and prepared for re-use.

Once tool 50 is loaded, it can be operated with one hand to install a gasket and snap ring. However, the operator may also use one hand to steady tool 50 and the other hand to move sleeve 102. If desired, a hammer or mallet may be used to tap sleeve 102 against second plate 80, or sleeve 102 may be removed and second plate 80 pushed by hand.

After tool 50 is positioned with gasket 30 resting against surface 14, a gentle push or tap ("finesse push") against plate 80 is all that is needed to urge snap ring 32 from loading groove 66. Depending on the dimensions of tool 50 and the stiffness of spring 96, the act of placing gasket 30 against surface 14 may impart sufficient forward motion to plate 80 and rods 90 to push ring 32 from loading groove 66. When gasket 30 is positioned against surface 14, ring 32 is centered in pipe 16 and properly positioned with respect to seating groove 20, so the operator does not need to manipulate the ring to maneuver it into the groove.

When tool 50 is used in a highly contaminated environment, such as with piping for conducting radioactive liquids or piping exposed to a neutron flux, extension rods may be used to lengthen shaft 52 and sleeve 102 to further reduce operator exposure. For manual operation of tool 50, shaft 52 may be up to approximately 6′ (about 1.8 m) long. Alternatively, tool 50 may be loaded and operated using remote manipulators.

By using tool 50, an operator can quickly and easily install a gasket and snap ring. Installation can be completed in as little as 5 seconds after loading tool 50, compared to manual installation which can take as long as 10–15 minutes. This reduces operator exposure to any hazardous substances in the area by a factor of over one hundred. As noted above, pliers or other tools may be used to load gasket 30 and ring 32 onto tool 50, and exposure may be further reduced by using protective clothing, glove bags and the like. Tool 50 may be loaded in a "clean" area and discarded after use in a highly radioactive environment. Alternatively, tool 50 may be tested and reused if it is not too highly contaminated. Tool 50 may be decontaminated if desired. However, decontamination procedures are complex and costly, and it is frequently more cost-effective to simply replace contaminated equipment.

Tool 50 is made of any materials that are suitable for the intended environment of use. First plate 60 is preferably made of a "non-grabby" material, that is, a material that can be finished with a smooth, slick surface that readily releases snap ring 32 and gasket 30. Soft metals such as brass and aluminum tend to be "grabby" and are less suitable for use with the invention. Plates 60 and 80 made of clear plastics such as LEXAN TM allow the operator to see gasket 30 and ring 32 during installation. However, metals such as stainless steel are also suitable. Second plate 80 may be made of the same material as plate 60, or some other material if desired. Rods 90, fasteners 92, shaft 52 and sleeve 102 are preferably made of stainless steel. Sleeve 102 may be a straight length of tubing as shown, or may have a thicker end portion for easier gripping by the operator.

Raised portion 70 of loading surface 62 may be integrally formed with plate 60, or machined separately and rigidly attached to plate 60. Rods 90 are preferably approximately evenly spaced about loading groove 66, in order to uniformly distribute the forward impulse imparted by the rods to snap ring 32. Tool 50 preferably has at least three rods 90 and more preferably four or more rods. The optimum number of rods 90 depends on the stiffness of ring 32: the sorer and more flexible the ring, the more rods 90 are needed for sufficiently uniform distribution, while the harder and less flexible the ring, the fewer rods are needed. If desired, rods 90 may be replaced by a plurality of partial-cylindrical members sliding in arcuate openings, to exert even more uniform pressure against ring 32.

Tool 50 may be made of readily-available, standard sized components, in dimensions that are suitable for holding the desired sizes of gasket and snap ring. For example, shaft 52 and sleeve 102 may be made of metal piping, such as $\frac{1}{4}$″ (about 0.6 cm) inner diameter (I.D.) piping for the former and $\frac{1}{2}$″ I.D. (about 1.3 cm) piping for the latter. Shaft 52 is approximately 6″ (about 15 cm) long, but may be up to approximately 6′ (about 1.8 m) long if desired.

First plate 60 is sized to be readily insertable into fitting 16, preferably with a diameter that is somewhat smaller than the inner diameter of fitting 16. For example, for use with standard 5″ (about 13 cm) O.D. piping, first plate 60 may be approximately 4.7″ (about 12 cm) in diameter and $\frac{3}{4}$″ (about 1.9 cm) thick at raised portion 70, with a shoulder 72 about $\frac{5}{8}$″ (about 1.6 cm) thick. Raised portion 70 and shoulder 72 are dimensioned to fit the gasket to be installed, that is, the gasket is flush with portion 70 when placed on shoulder 72. As noted above, the diameter of loading groove 66 is preferably somewhat smaller than the diameter of seating groove 20.

Forward end 54 of shaft 52 is preferably threaded, and screwed into a suitably-sized threaded hole in plate 60. Thus, plate 60 can be easily replaced if it becomes contaminated by radioactive or other hazardous substances. Alternatively, plate 60 can be attached to shaft 52 by some other means, such as welding.

Rods 90 may be $\frac{1}{8}$″ (about 0.3 cm) diameter bolts, attached to second plate 80 by standard $\frac{1}{8}$″ nuts. For this size rod, openings 68 in first plate 60 are approximately 5/32″ (about 0.4 cm) in diameter. Spring 96 may be a helical spring with an outer diameter (O.D.) of about $\frac{3}{4}$″ (about 1.9 cm), made of 22 gauge stainless steel.

Once loading surface 62 of tool 50 is positioned in fitting 16, rods 90 need move only a small distance forwards—typically no more than $\frac{1}{4}$″ (about 0.6 cm)—to push snap ring 32 from loading groove 66 into seating groove 20. The length of rods 90, the stiffness of spring 96, and the thickness of plates 60 and 80 depend on the sizes of the gasket and snap ring to be installed. For example, for a plate 60 that is approximately 4.7" (about 12 cm) in diameter, rods 90 may be approximately 3.0" (about 7.6 cm) long. However, shorter rods 90 may be used without departing from the spirit of the present invention. Since rods 90, spring 96, and plates 60 and 80 cooperate to install a gasket and ting, the optimum dimensions of these components are best determined by a modest amount of experimentation for each particular application.

Tool 50 may be used to install gaskets and snap tings in the manner described above. When a gasket 30 is not needed, tool 50 can be loaded solely with a snap ring 32. If desired, tool 50 may be provided with means for ensuring that a snap ring is positioned at the proper depth for installation inside a pipe or pipe fitting, i.e. in the approximate plane of seating groove 20. Stops may be attached to shaft 52 .rearward of second plate 80, or to forward ends 94 of rods 90, to limit the movement of plate 80 and prevent withdrawal of the rods from plate 60.

It will be apparent to those skilled in the art that many changes and substitutions can be made to the preferred embodiment herein described without departing from the spirit and scope of the present invention as defined by the appended claims.

What is claimed is:

1. A tool for installing a snap ring in an internal seating groove in a pipe, said snap ring having a diameter, said tool comprising:

a shaft having a forward end and a rearward end;

a first plate attached to said forward end of said shaft, said first plate having a forward surface and a rearward surface, said forward surface having means formed therein for receiving said snap ring;

a second plate having a forward surface and a rearward surface, said second plate slidably carried by said shaft; and pushing means attached to said forward surface of said second plate, said pushing means communicating with said receiving means for urging said snap ring from said receiving means when said second plate is moved towards said first plate.

2. The tool as recited in claim 1, wherein said receiving means further comprises a groove having a diameter just smaller than said diameter of said snap ring.

3. The tool as recited in claim 1, wherein said receiving means further comprises a groove having a diameter smaller than said diameter of said snap ring, wherein said first plate has a plurality of openings formed therethrough, said openings communicating with said groove, and wherein said pushing means further comprises a plurality of rods attached to said forward surface of said second plate, each of said rods slidable in an opening of said plurality of openings to enter said groove and engage said snap ring.

4. The tool as recited in claim 1, wherein said receiving means further comprises a groove having a diameter smaller than said diameter of said snap ring, wherein said first plate has a plurality of openings formed therethrough, said openings communicating with said groove, and wherein said pushing means further comprises:

a plurality of rods attached to said forward surface of said second plate, each of said rods slidable in an opening of said plurality of openings to enter said groove and engage said snap ring; and means carded by said shaft for moving said second plate towards said first plate.

5. The tool as recited in claim 1, wherein said receiving means further comprises a groove having a diameter smaller than said diameter of said snap ring, wherein said first plate has a plurality of openings formed therethrough, said openings communicating with said groove, and wherein said pushing means further comprises:

a plurality of rods attached to said forward surface of said second plate, each of said rods slidable in an opening of said plurality of openings to enter said groove and engage said snap ring; and a sleeve disposed about said shaft, said sleeve slidable on said shaft to engage said rearward surface of said second plate and move said second plate towards said first plate.

6. The tool as recited in claim 1, wherein said receiving means further comprises a groove having a diameter smaller than said diameter of said snap ring, wherein said first plate has a plurality of openings formed therethrough, said openings communicating with said groove, and wherein said pushing means further comprises:

means for biasing said first and said second plates to a preferred position with respect to each other, said biasing means positioned between said first and said second plates; and a plurality of rods attached to said forward surface of said second plate, each of said rods slidable in an opening of said plurality of openings to enter said groove and engage said snap ring when said plates are moved towards one another from said preferred position, said biasing means restoring said plates to said preferred position when said snap ring leaves said groove.

7. The tool as recited in claim 1, wherein said receiving means further comprises a groove having a diameter smaller than said diameter of said snap ring, wherein said first plate has a plurality of openings formed therethrough, said openings communicating with said groove, and wherein said pushing means further comprises:

a spring disposed about said shaft between said first plate and said second plate, said spring biasing said first and said second plates to a preferred position with respect to each other; and a plurality of rods attached to said forward surface of said second plate, each of said rods slidable in an opening of said plurality of openings to enter said groove and engage said snap ring when said first and said second plate are moved towards one another from said preferred position, said spring restoring said plates to said preferred position when said snap ring leaves said groove.

8. A tool for installing a gasket and a snap ring in a pipe, said pipe having an internal flange for supporting said gasket and an internal seating groove for receiving said snap ting, said snap ring having a diameter and said pipe having an internal diameter, said tool comprising:

a shaft having a forward end and a rearward end;

a first plate attached to said forward end of said shaft, said first plate having a forward surface and a rearward surface, said forward surface having a shoulder formed thereon for receiving said gasket, said shoulder having a groove formed therein, said groove having a diameter smaller than said diameter of said snap ring, said first plate having a plurality of openings formed therethrough, said openings communicating with said groove;

a second plate having a forward surface and a rearward surface, said second plate slidably carried by said shaft; and a plurality of rods attached to said forward surface of said second plate, each of said rods slidable in an opening of said plurality of openings, said rods entering said groove to engage said snap ring and urge said snap ring from said groove when said second plate is moved towards said first plate.

9. The tool as recited in claim 8, wherein said first plate has a diameter smaller than said internal diameter of said pipe.

10. The tool as recited in claim 8, wherein said first plate has a diameter smaller than said internal diameter of said pipe, so that said rods urge said snap ring into said seating groove when said forward surface of said first plate is placed against said flange and said second plate is moved towards said first plate.

11. The tool as recited in claim 8, further comprising means carried by said shaft for moving said second plate towards said first plate.

12. The tool as recited in claim 8, further comprising a sleeve disposed about said shaft, said sleeve slidable on said shaft to engage said rearward surface of said second plate and move said second plate towards said first plate.

13. The tool as recited in claim 8, further comprising means for biasing said first and said second plates to a preferred position with respect to each other, said biasing means positioned between said first and said second plates.

14. The tool as recited in claim 8, further comprising a spring disposed about said shaft between said first plate and said second plate, said spring biasing said first and said second plates to a preferred position with respect to each other.

15. The tool as recited in claim 8, wherein said first plate is approximately parallel to said second plate.

16. A tool for installing a gasket and a snap ring in a hollow pipe, said pipe having an internal flange for supporting said gasket and an internal seating groove for receiving said snap ring, said snap ring having a diameter and said pipe having an internal diameter, said tool comprising:

a shaft having a forward end and a rearward end;

a first plate having a forward surface and a rearward surface, said forward surface having a shoulder dimensioned for receiving said gasket, said shoulder having formed therein a groove having a diameter smaller than said diameter of said snap ring, said first plate having a plurality of openings formed therethrough, said openings communicating with said groove;

a second plate having a forward surface and a rearward surface, said second plate slidably carried by said shaft, said second plate being approximately parallel to said first plate; and a plurality of rods attached to said forward surface of said second plate, said rods being approximately parallel to said shaft, each of said rods having an end slidable in an opening of said plurality of openings, said ends of said rods entering said groove and engaging said snap ring to urge said snap ring from said groove when said second plate is moved towards said first plate.

17. The tool as recited in claim 16, further comprising a sleeve carded by said shaft, said sleeve slidable on said shaft to engage said rearward surface of said second plate and move said second plate towards said first plate.

18. The tool as recited in claim 16, wherein said openings are approximately evenly spaced about said groove.

19. The tool as recited in claim 16, further comprising a spring disposed about said shaft between said first plate and said second plate, said spring biasing said first and said second plates to a preferred position with respect to each other.

20. The tool as recited in claim 16, wherein said plurality of openings further comprises at least three openings, and wherein said plurality of rods further comprises at least three rods.

* * * * *